US010615560B2

(12) United States Patent
Fan (10) Patent No.: US 10,615,560 B2
(45) Date of Patent: Apr. 7, 2020

(54) PHASE CALIBRATION METHOD AND LASER PROJECTOR

(71) Applicant: DELTA ELECTRONICS, INC., Taoyuan (TW)

(72) Inventor: Chang-Hsien Fan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/357,336

(22) Filed: Mar. 19, 2019

(65) Prior Publication Data
US 2020/0044410 A1    Feb. 6, 2020

(30) Foreign Application Priority Data

Aug. 3, 2018  (CN) .......................... 2018 1 0876008

(51) Int. Cl.
| | | |
|---|---|---|
| G03B 21/20 | (2006.01) | |
| H01S 3/10 | (2006.01) | |
| G02B 26/00 | (2006.01) | |
| H04N 9/31 | (2006.01) | |
| H01S 3/13 | (2006.01) | |

(52) U.S. Cl.
CPC ........ *H01S 3/10053* (2013.01); *G02B 26/008* (2013.01); *G03B 21/204* (2013.01); *G03B 21/2033* (2013.01); *H01S 3/1307* (2013.01); *H04N 9/3155* (2013.01)

(58) Field of Classification Search
CPC ........................... G03B 21/204; G03B 21/208; G03B 21/2013; G03B 21/2033; G03B 21/2053; H04N 9/3111; H04N 9/3114; H04N 9/3117; H04N 9/3135; H04N 9/3155; H04N 9/3158; H04N 9/3161; H04N 9/3198; H01S 3/0941; H01S 3/1307; H01S 3/1643; H01S 3/10053
See application file for complete search history.

(56) References Cited

U.S. PATENT DOCUMENTS

| | | |
|---|---|---|
| 8,819,122 B2 | 8/2014 | Ravichandran et al. |
| 2015/0124431 A1* | 5/2015 | Motoya ................ G02B 26/008 362/84 |
| 2019/0199981 A1* | 6/2019 | Murakami ............. G03B 21/00 |

FOREIGN PATENT DOCUMENTS

| | | |
|---|---|---|
| CN | 102043218 A | 5/2011 |
| TW | I622303 B | 4/2018 |

* cited by examiner

*Primary Examiner* — Sultan Chowdhury
(74) *Attorney, Agent, or Firm* — CKC & Partners Co., LLC (57) ABSTRACT

A phase calibration method includes: producing a synchronization signal; controlling switches of a light source based on a time series; measuring a first light intensity of the light passing through a phosphor wheel and a color wheel; changing phases of the phosphor wheel or the color wheel; measuring a second light intensity of the light passing through the phosphor wheel and the color wheel; changing the phases of the phosphor wheel or the color wheel again; measuring a third light intensity of the light passing through the phosphor wheel and the color wheel; repeating changing the phases if the second light intensity is greater than the first light intensity, and the third light intensity is greater than the second light intensity; or when the second light intensity is smaller than the first light intensity, and the third light intensity is greater than the first light intensity.

18 Claims, 9 Drawing Sheets

PHASE CALIBRATION METHOD AND LASER PROJECTOR

CROSS-REFERENCE TO RELATED APPLICATION

This application claims priority to Chinese Application Serial Number 201810876008.2, filed Aug. 3, 2018, the disclosure of which is incorporated herein by reference in its entirety.

BACKGROUND

In the conventional phase calibration method of the laser projector, a light sensor in front of the laser projector is required, and the light sensor is connected to an oscilloscope. Then the phases of the phosphor wheel and the color wheel are adjusted manually, and the optimized phases of the phosphor wheel and the color wheel are determined according to the waveform shape shown on the oscilloscope.

Therefore, the conventional phase calibration method of the laser projector requires not only labor but also greater consumption costs of time and devices. Furthermore, the determination of the optimized phases of the phosphor wheel and the color wheel according to the waveform makes it difficult to improve the precision of the phase calibration.

SUMMARY

According to one aspect of the present invention, a phase calibration method applied for a laser projector is provided. The phase calibration method comprising steps of: (a) transmitting, by a processor, a synchronization signal to a laser driver; (b) controlling, by the laser driver, switches of a laser light source based on a time series of the synchronization signal; (c) measuring, by a light sensor, a first intensity of a laser light of the laser light source having sequentially passed through a phosphor wheel and a color wheel; (d) changing a phase of the phosphor wheel or a phase of the color wheel; (e) measuring, by the light sensor, a second light intensity of the laser light of the laser light source having sequentially passed through the phosphor wheel and the color wheel; (f) further changing the phase of the phosphor wheel or the phase of the color wheel by: (f1) decreasing the phase of the phosphor wheel or the phase of the color wheel, if the first light intensity is greater than the second light intensity, and the phase of the phosphor wheel or the phase of the color wheel is increased in step (d); or (f2) decreasing the phase of the phosphor wheel or the phase of the color wheel, if the first light intensity is smaller than the second light intensity, and the phase of the phosphor wheel or the phase of the color wheel is decreased in step (d); or (f3) increasing the phase of the phosphor wheel or the phase of the color wheel, if the first light intensity is greater than the second light intensity, and the phase of the phosphor wheel or the phase of the color wheel is decreased in step (d); or (f4) increasing the phase of the phosphor wheel or the phase of the color wheel, if the first light intensity is smaller than the second light intensity, and the phase of the phosphor wheel or the phase of the color wheel is increased in step (d); (g) measuring a third light intensity of the laser light of the laser light source having sequentially passed through the phosphor wheel and the color wheel by the light sensor; and (h) repeating step (f) and step (g) if the second light intensity is greater than the first light intensity, and the third light intensity is greater than the second light intensity; or the second light intensity is smaller than the first light intensity, and the third light intensity is greater than the first light intensity.

According to another aspect of the present invention, a laser projector is provided. The laser projector comprising: a laser light source module including a laser driver, wherein the laser light source module is configured to produce a laser light; a processor electrically connected to the laser driver and configured to transmit a synchronization signal to the laser driver; a phosphor wheel electrically connected to the processor; a color wheel electrically connected to the processor; and a light sensor electrically connected to the laser driver, wherein the phosphor wheel is located between the laser light source module and the color wheel, wherein the color wheel is located between the phosphor wheel and the light sensor, and wherein the light sensor is configured to sense an intensity of the laser light produced by the laser light source module and having sequentially passed through the phosphor wheel and the color wheel.

In the foregoing embodiments of the present invention, the laser light in the phase calibration method and the laser projector of the present disclosure can be provided according to the time series of the synchronization signal, the light sensor can measure light intensities, and the processor can repeat steps of changing the phases and measuring light intensities until a relative maximum of the integration of light intensities is determined. Accordingly, it may remove the need for placing an extra light sensor outside the projector, as well as manually observing the waveform from the oscilloscope to determine whether the phosphor wheel phase and the color wheel phase are optimized. The phase calibration method of the present disclosure can reduce the costs of labor and time, and improve upon the inconvenience of changing the phases and measuring the light intensity manually.

DETAILED DESCRIPTION

The following disclosure provides different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed that are between the first and second features, such that the first and second features are not in direct contact. In addition, the present disclosure may repeat reference numerals and/or letters in the various examples. This repetition does not in itself dictate a relationship between the various embodiments and/or configurations discussed.

Figure 1:
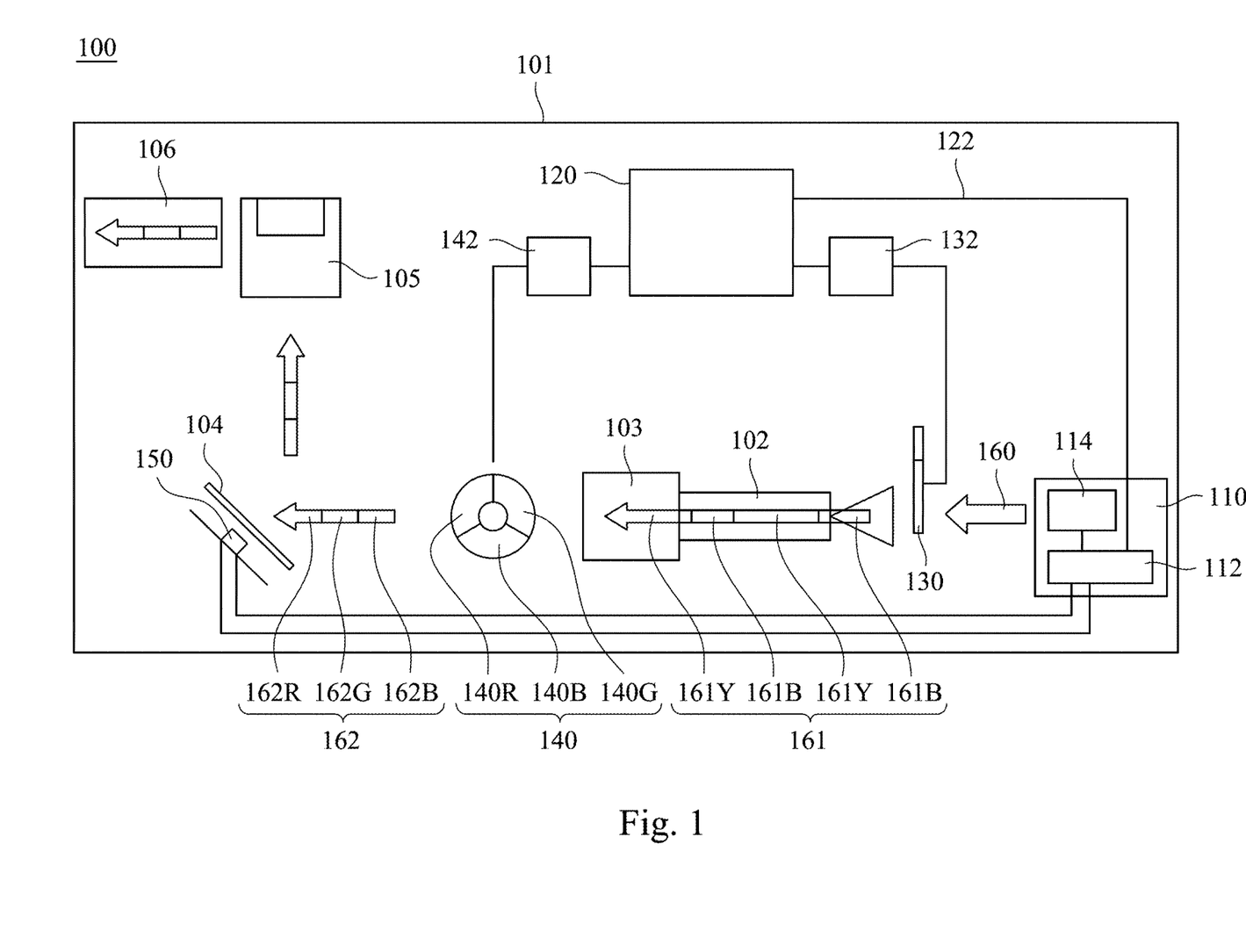
FIG. 1 is a block diagram of a laser projector according to one embodiment of the present disclosure.

Referring to FIG. 1, a laser projector 100 (for example a single-chip laser projector) includes laser light source module 110, processor 120, phosphor wheel 130, color wheel 140, and light sensor 150.

The laser light source module 110 has laser driver 112 and laser light source 114, and the processor 120 is electrically connected to the laser driver 112. The processor 120 is configured to form a synchronization signal 122 and transmit the synchronization signal 122 to the laser driver 112. The phosphor wheel 130 is electrically connected to the processor 120. The color wheel 140 is electrically connected to the processor 120. The phosphor wheel 130 is located between the laser light source module 110 and the color wheel 140. The light sensor 150 is electrically connected to the laser driver 112. The color wheel 140 is located between the phosphor wheel 130 and the light sensor 150. The light sensor 150 is configured to sense the intensities of the laser light 160 having sequentially passed through the phosphor wheel 130 and the color wheel 140, and to transmit the information of each of the intensities to the laser driver 112.

The laser projector 100 further includes housing 101, integration rod 102, relay lens 103, reflection mirror 104, digital micromirror device (DMD) 105, and projection lens 106. The light sensor 150 is located inside the housing 101. The integration rod 102 and the relay lens 103 are located between the phosphor wheel 130 and the color wheel 140. The reflection mirror 104 is located between the color wheel 140 and the light sensor 150. The light sensor 150 is located at a side of the reflection mirror 104 distal to the color wheel 140. In the present embodiment, the laser light source module 110, the phosphor wheel 130, the color wheel 140, and the light sensor 150 are substantially located along a line of light path. The reflection mirror 104 can reflect most of the laser light 160, and the rest of the laser light 160 can transmit through. Therefore, the light sensor 150 can sense the laser light 160 transmitted through the reflection mirror 104 after the laser light 160 passed through the phosphor wheel 130 and the color wheel 140.

The laser projector 100 further includes phosphor wheel motor driver 132 and color wheel motor driver 142. The phosphor wheel 130 is electrically connected to the processor 120 through the phosphor wheel motor driver 132, and the processor 120 is configured to control the phosphor wheel motor driver 132 to change the phase of the phosphor wheel 130. The color wheel 140 is electrically connected to the processor 120 through the color wheel motor driver 142, and the processor 120 is configured to control the color wheel motor driver 142 to change the phase of the color wheel 140.

In the present embodiment, when the laser projector 100 is in use, the laser driver 112 drives the laser light source 114 to ON state and produce the laser light 160. According to the phase of the phosphor wheel 130, the blue light 161B is produced after the laser light 160 passing through the glass part of the phosphor wheel 130, and the yellow light 161Y is produced after the laser light 160 passing through the phosphor powder part of the phosphor wheel 130. In the present embodiment, the color wheel 140 includes red filter 140R, green filter 140G, and blue filter 140B. According to the phase of the color wheel 140, red light 162R is produced after the yellow light 161Y passing through the red filter 140R, and the green light 162G is produced after the yellow light 161Y passing through the green filter 140G. Blue light 162B is produced after the blue light 161B passes through the blue filter 140B. In other embodiments, the color wheel 140 may include filters with more than three colors, and it is not intended to limit the present disclosure.

In the present embodiment, when the laser projector 100 is in calibration, the optimized phase of the phosphor wheel 130 and the optimized phase of the color wheel 140 can be found by the intensities of the red light 162R, the green light 162G, and the blue light 162B respectively measured by the light sensor 150.

Figure 2:
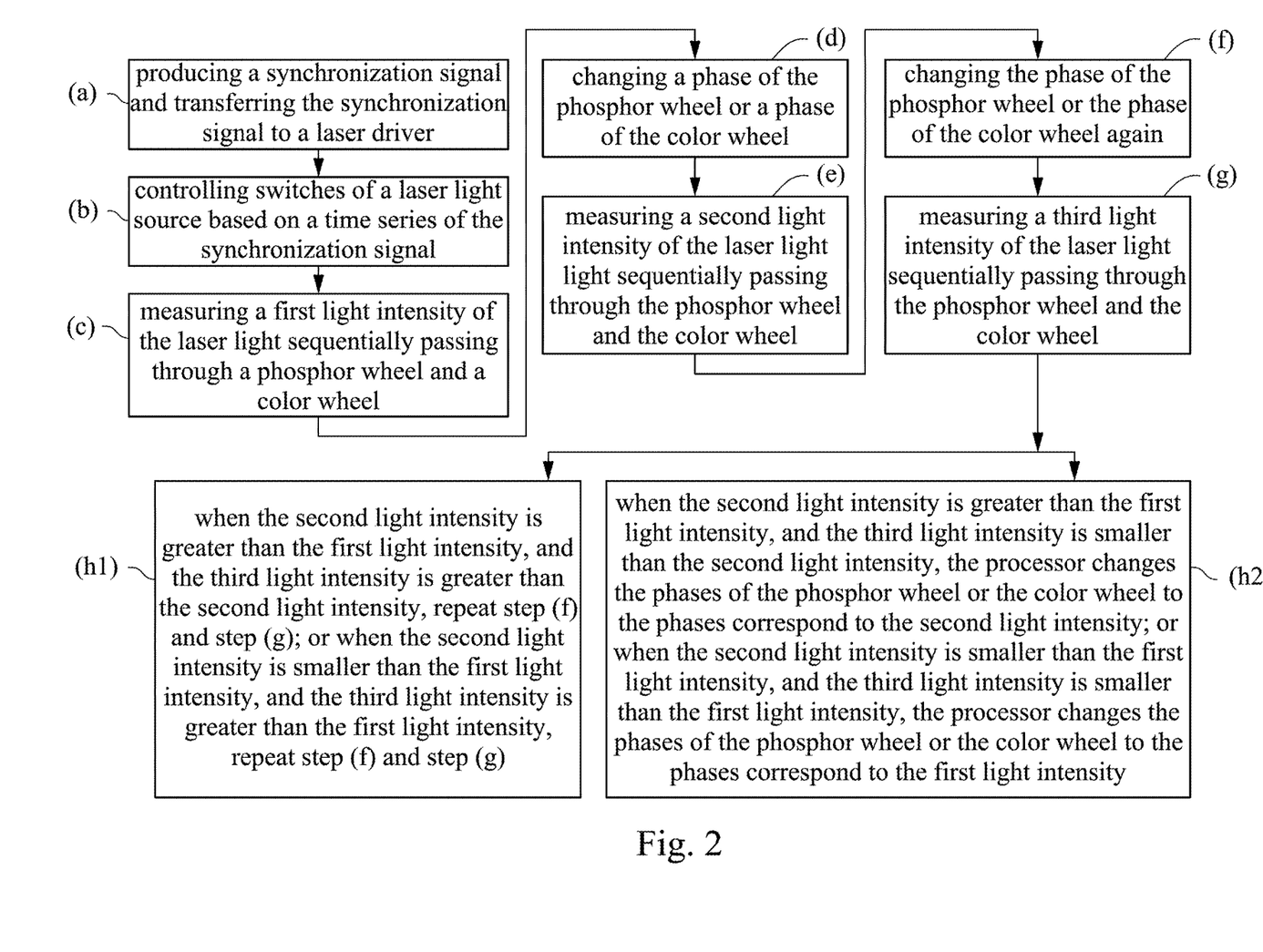
FIG. 2 is a flow chart of a phase calibration method according to one embodiment of the present disclosure.

FIG. 2 is a flow chart of a phase calibration method according to one embodiment of the present disclosure. The phase calibration method includes the following steps. First, in step (a), producing a synchronization signal and transferring the synchronization signal to a laser driver. In step (b), the laser driver controls switches of a laser light source based on a time series of the synchronization signal. In step (c), the light sensor measures a first light intensity of the light having sequentially passed through a phosphor wheel and a color wheel. In step (d), changing a phase of the phosphor wheel or a phase of the color wheel. In step (e), measuring a second light intensity of the light having sequentially passed through the phosphor wheel and the color wheel by the light sensor. In step (f), changing the phase of the phosphor wheel or the phase of the color wheel again. In step (g), measuring a third light intensity of the light having sequentially passed through the phosphor wheel and the color wheel by the light sensor. Later in step (h), when the second light intensity is greater than the first light intensity, and the third light intensity is greater than the second light intensity, repeat step (f) and step (g), or when the second light intensity is smaller than the first light intensity, and the third light intensity is greater than the first light intensity, repeat step (f) and step (g). The above steps will be further described in the following paragraphs.

Referring to FIG. 1 and FIG. 2 together. In step (a), the processor 120 forms a synchronization signal 122 and transmit the synchronization signal 122 to the laser driver 112, and the time series of the synchronization signal and the time series of the color wheel 140 are synchronized. In step (b), the laser driver 112 controls the switches of the laser light source 114 according to the time series of the synchronization signal 122. For example, when blue light is required for measurement during the calibration process, the laser driver 112 drives the laser light source 114 to ON state during the time series of blue light according to the time series of the synchronization signal 122, and drives the laser light source 114 to OFF state during the time series of red light and green light. When green light is required for measurement during the calibration process, the laser driver 112 drives the laser light source 114 to ON state during the time series of green light according to the time series of the synchronization signal 122, and drives the laser light source 114 to OFF state during the time series of blue light and red light.

In step (c), the light sensor 150 measures the first light intensity of the laser light 160 having sequentially passed through the phosphor wheel 130 and the color wheel 140. The light sensor 150 transmits the information of the measured first light intensity I1 to the laser driver 112, and the processor 120 will read the information of the first light intensity I1 from the laser driver 112. The first light intensity I1 is the integration of the light intensity that passes through the phosphor wheel 130 and the color wheel 140 during the time series corresponds to the light for measurement with time. The influences of the phosphor wheel 130 and the color wheel 140 to the first light intensity I1 will be described in the following paragraphs and the figures.

Figure 3A:
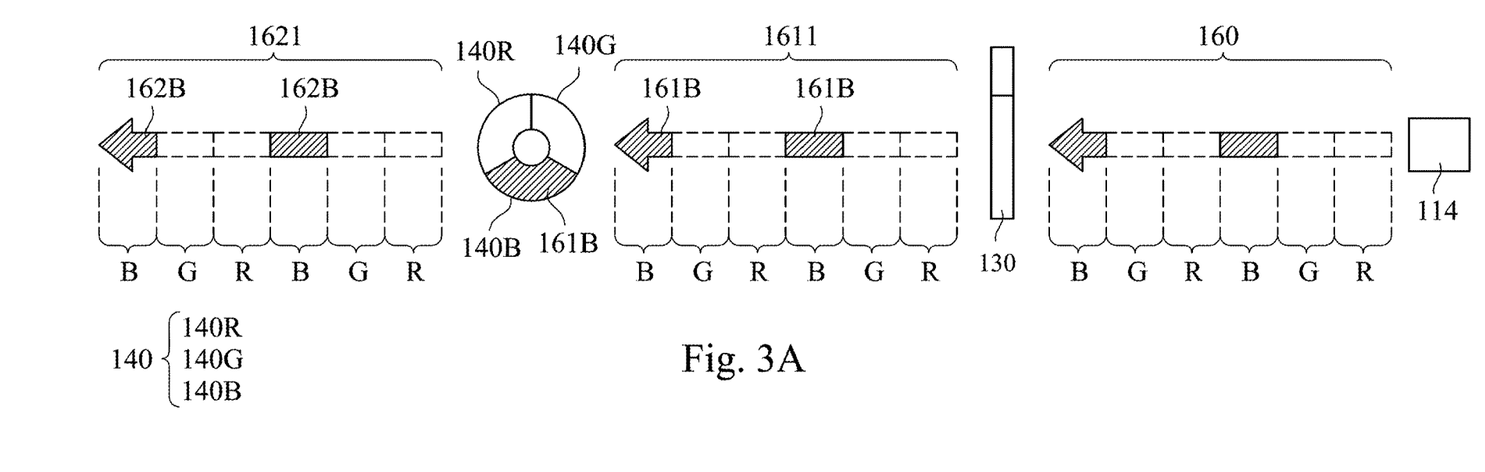
FIG. 3A is a schematic figure of a laser light passing through a phosphor wheel and a color wheel.
Figure 3B:
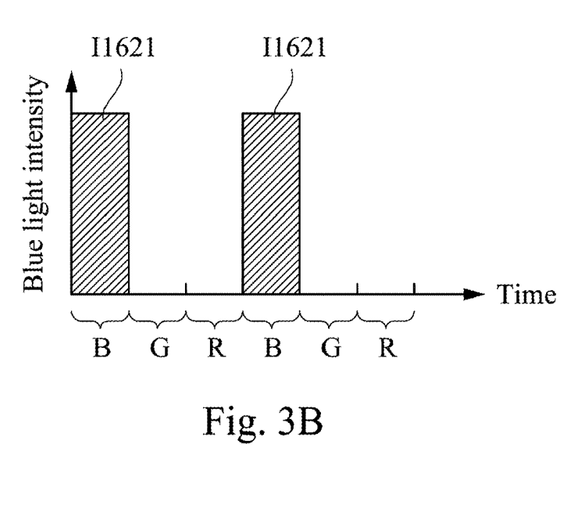
FIG. 3B is a correlation plot between the intensity of the light in FIG. 3A and the time series.

Referring to FIG. 3A and FIG. 3B together. In the present embodiment, the light sensor 150 measures the blue light to calibrate the phases of the phosphor wheel 130 or the color wheel 140. The laser driver 112 drives the laser light source 114 to ON state to produce laser light 160 only during the time series of blue light according to the time series of the synchronization signal 122. In the present embodiment, the phosphor wheel 130 has no phase offset, and the color wheel 140 has no phase offset.

In the embodiment of FIG. 3A, the laser light 160 forms the color light 1611 after passing through the phosphor wheel 130, and the color light 1611 forms the color light 1621 after passing through the color wheel 140. As illustrated in the color light 1611, the laser light 160 forms the blue light 161B after completely passing through a glass portion of the phosphor wheel 130. As illustrated in the color light 1621, the blue light 161B forms the blue light 162B after completely passing through the blue filter 140B. As illustrated in FIG. 3B, blue light intensity I1621 is the integration of the light intensity of the blue light 162B measured by the light sensor 150 with time.

Figure 3C:
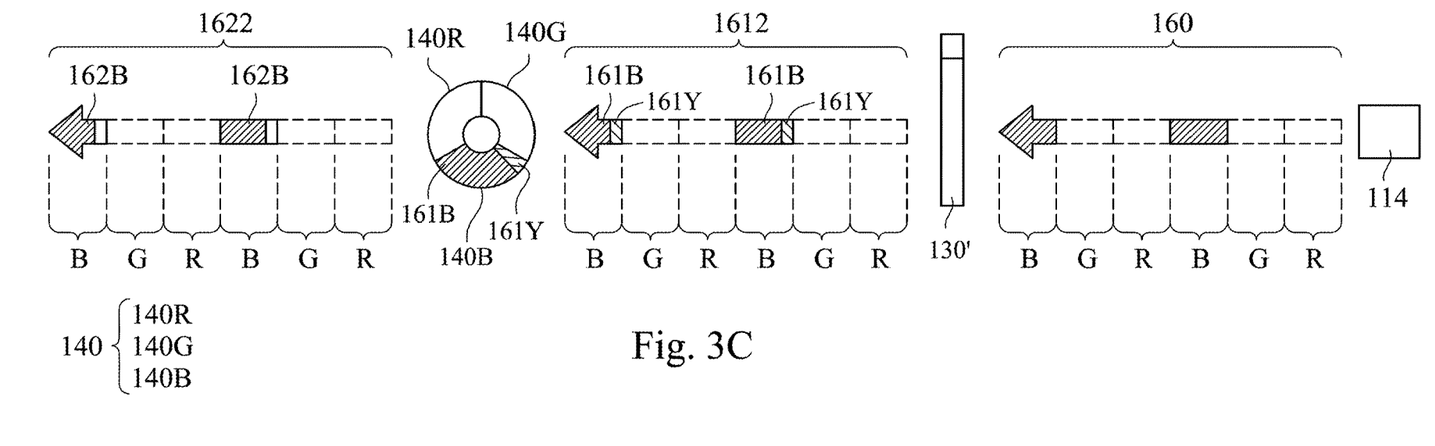
FIG. 3C is a schematic figure of another laser light passing through a phosphor wheel and a color wheel.
Figure 3D:
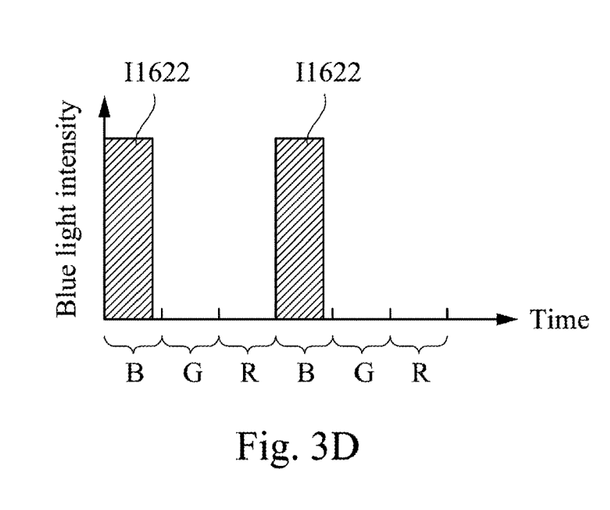
FIG. 3D is a correlation plot between the intensity of the light in FIG. 3C and the time series.

Referring to FIG. 3C and FIG. 3D together. In the present embodiment, the light sensor 150 measures the blue light to calibrate the phases of the phosphor wheel 130' or the color wheel 140. The laser driver 112 drives the laser light source 114 to ON state to produce laser light 160 only during the time series of blue light according to the time series of the synchronization signal 122. In the present embodiment, the phosphor wheel 130' has phase offset, and the color wheel 140 has no phase offset.

In the embodiment of FIG. 3C, the laser light 160 forms the color light 1612 after passing through the phosphor wheel 130', and the color light 1612 forms the color light 1622 after passing through the color wheel 140. As illustrated in the color light 1612, a portion of the laser light 160 forms the blue light 161B after passing through the glass portion of the phosphor wheel 130', and another portion of the laser light 160 forms the yellow light 161Y after passing through the phosphor powder portion of the phosphor wheel 130'. As illustrated in the color light 1622, the blue light 161B forms the blue light 162B after completely passing through the blue filter 140B, and the yellow light 161Y is filtered by the blue filter 140B. As illustrated in FIG. 3D, blue light intensity I1622 is the integration of the light intensity of the blue light 162B measured by the light sensor 150 with time.

According to the blue light intensity I1621, I1622 in FIG. 3B and FIG. 3D, the phase offset of the phosphor wheel 130' reduces the total quantity of the blue light 161B in the color light 1612, therefore the blue light intensity I1622 is smaller than the blue light intensity I1621.

Accordingly, since the laser light 160 is only produced during the time series of blue light, the laser light 160 completely passes through the glass portion of the phosphor wheel 130 when the phosphor wheel 130 has no phase offset, and the integration of the blue light intensity measured by the light sensor 150 with time is the relative maximum value.

Figure 3E:
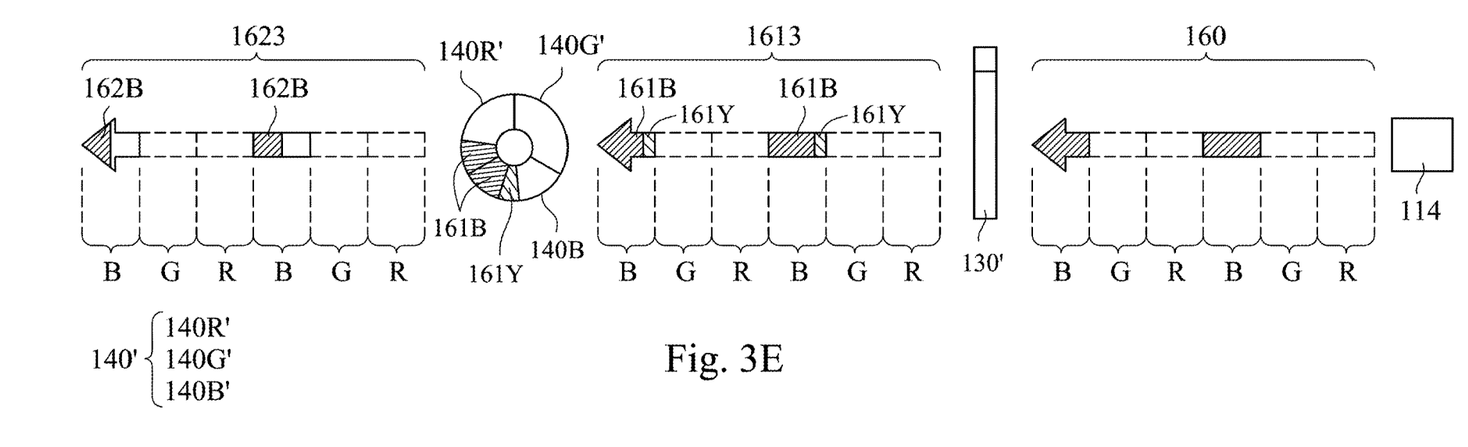
FIG. 3E is a schematic figure of another laser light passing through a phosphor wheel and a color wheel.
Figure 3F:
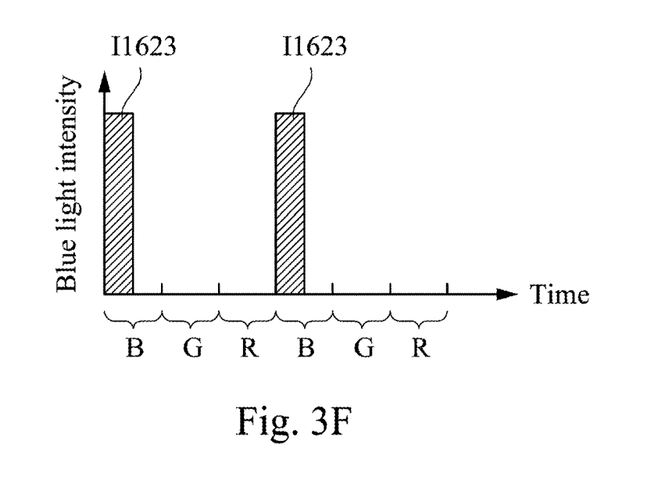
FIG. 3F is a correlation plot between the intensity of the light in FIG. 3E and the time series.

Referring to FIG. 3E and FIG. 3F together. In the present embodiment, the light sensor 150 measures the blue light to calibrate the phases of the phosphor wheel 130' or the color wheel 140'. The laser driver 112 drives the laser light source 114 to ON state to produce laser light 160 only during the time series of blue light according to the time series of the synchronization signal 122. In the present embodiment, the phosphor wheel 130' has phase offset, and the color wheel 140' has phase offset.

In the embodiment of FIG. 3E, the laser light 160 forms the color light 1613 after passing through the phosphor wheel 130', and the color light 1613 forms the color light 1623 after passing through the color wheel 140'. As illustrated in the color light 1613, a portion of the laser light 160 forms the blue light 161B after passing through the glass portion of the phosphor wheel 130', and another portion of the laser light 160 forms the yellow light 161Y after passing through the phosphor powder portion of the phosphor wheel 130'. As illustrated in the color light 1623, a portion of the blue light 161B forms the blue light 162B after passing through the blue filter 140B', and the yellow light 161Y is filtered by the blue filter 140B'. As illustrated in FIG. 3F, blue light intensity I1623 is the integration of the light intensity of the blue light 162B measured by the light sensor 150 with time.

According to the blue light intensity I1622 in FIG. 3D and the blue light intensity I1623 in FIG. 3F, the phase offset of the color wheel 140' reduces the total quantity of the blue light 162B in the color light 1623, therefore the blue light intensity I1623 is smaller than the blue light intensity I1622.

Accordingly, since the laser light 160 is only produced during the time series of blue light, the blue light 161B formed after the laser light 160 passing through the phosphor wheel 130 completely passes through the blue filter 140B when the color wheel 140 has no phase offset, and the integration of the blue light intensity measured by the light sensor 150 with time is the relative maximum value. Therefore, the optimized phase of the color wheel 140 can be determined by finding out the relative maximum of the integration of the light intensity with time at various phase of the color wheel 140.

Furthermore, accordingly to FIG. 3D and FIG. 3F, the phase offset of the phosphor wheel 130' does not influence the results of the optimized phase of the color wheel 140 determined by the integration of the blue light intensity. Therefore, the order of performing the calibration of the phosphor wheel 130 or the color wheel 140 can be freely adjusted.

Figure 4A:
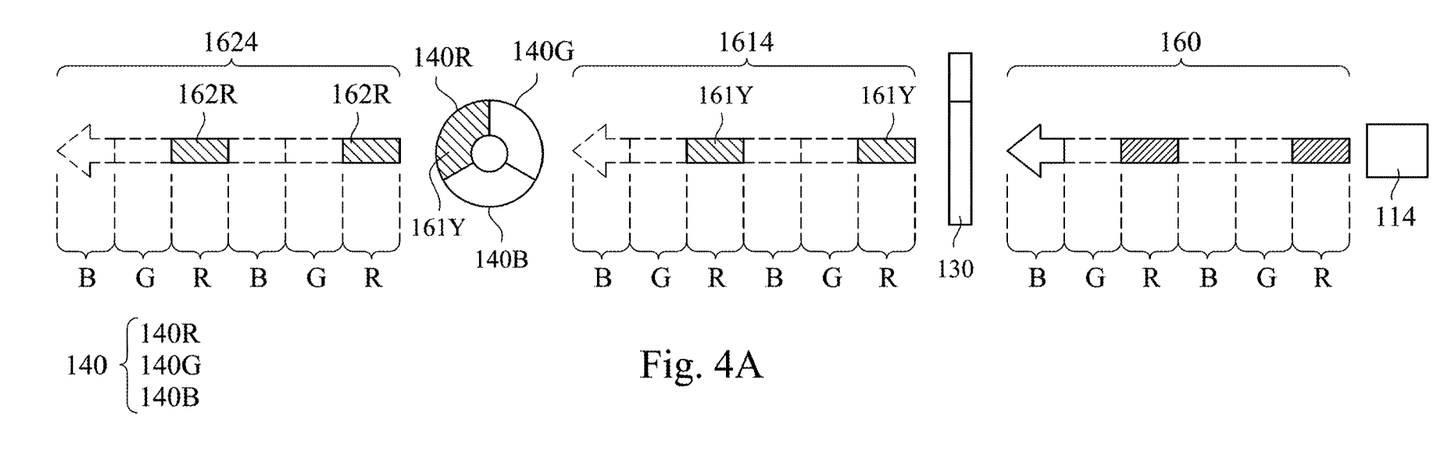
FIG. 4A is a schematic figure of a laser light passing through a phosphor wheel and a color wheel.
Figure 4B:
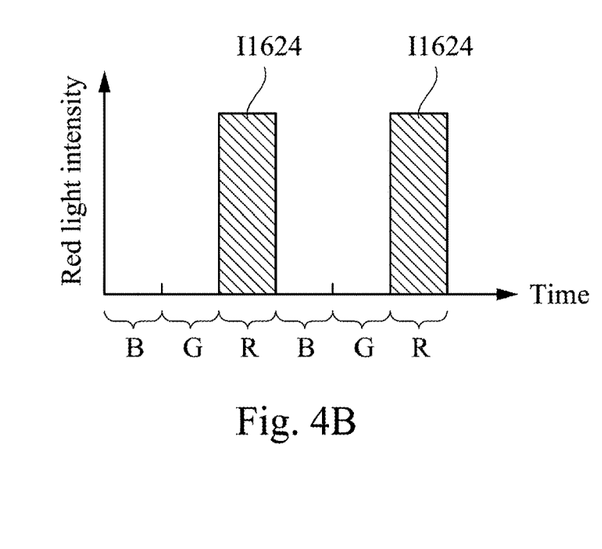
FIG. 4B is a correlation plot between the intensity of the light in FIG. 3A and the time series.

Referring to FIG. 4A and FIG. 4B together. In the present embodiment, the light sensor 150 measures the red light to calibrate the phases of the phosphor wheel 130 or the color wheel 140. The laser driver 112 drives the laser light source 114 to ON state to produce laser light 160 only during the time series of red light according to the time series of the synchronization signal 122. In the present embodiment, the phosphor wheel 130 has no phase offset, and the color wheel 140 has no phase offset.

In the embodiment of FIG. 4A, the laser light 160 forms the color light 1614 after passing through the phosphor wheel 130, and the color light 1614 forms the color light 1624 after passing through the color wheel 140. As illustrated in the color light 1614, the laser light 160 forms the yellow light 161Y after completely passing through the phosphor powder portion of the phosphor wheel 130. As illustrated in the color light 1624, the yellow light 161Y forms the red light 162R after completely passing through the red filter 140R. As illustrated in FIG. 4B, red light intensity I1624 is the integration of the light intensity of the red light 162R measured by the light sensor 150 with time.

Figure 4C:
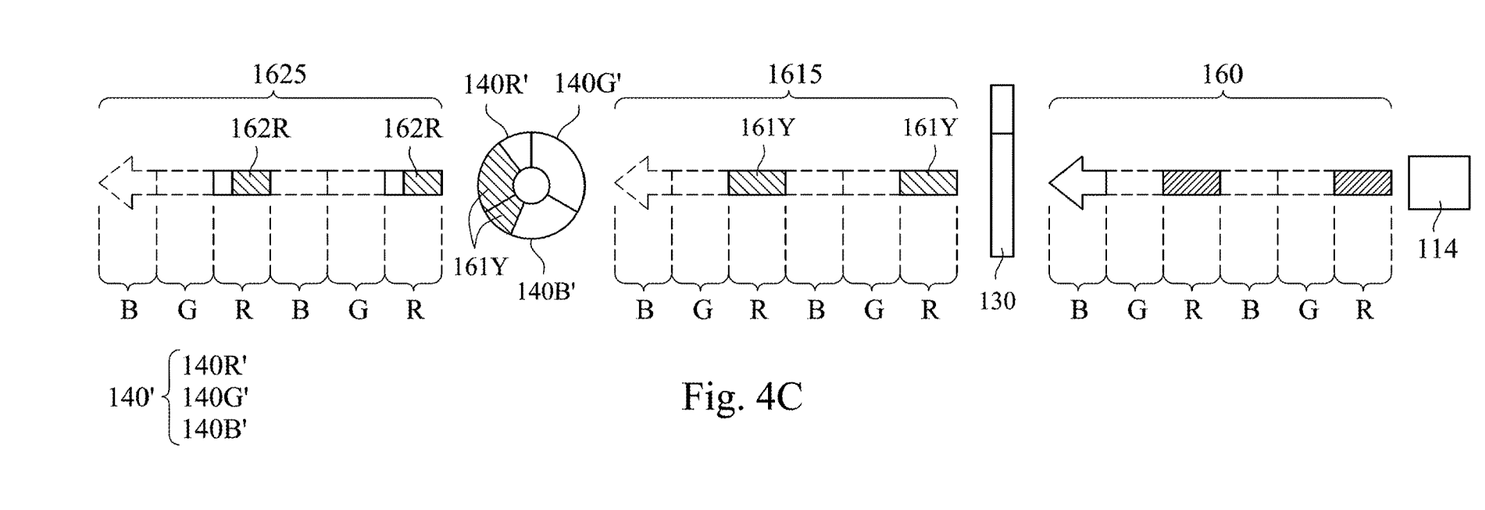
FIG. 4C is a schematic figure of another laser light passing through a phosphor wheel and a color wheel.
Figure 4D:
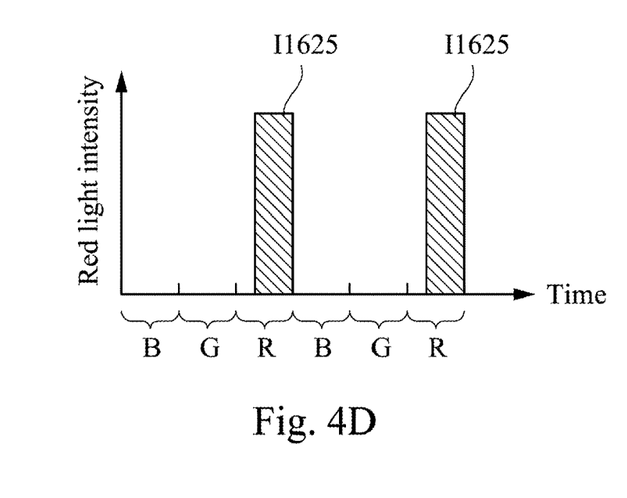
FIG. 4D is a correlation plot between the intensity of the light in FIG. 4C and the time series.

Referring to FIG. 4C and FIG. 4D together. In the present embodiment, the light sensor 150 measures the red light to calibrate the phases of the phosphor wheel 130 or the color wheel 140'. The laser driver 112 drives the laser light source 114 to ON state to produce laser light 160 only during the time series of red light according to the time series of the synchronization signal 122. In the present embodiment, the phosphor wheel 130 has no phase offset, and the color wheel 140' has phase offset.

In the embodiment of FIG. 4C, the laser light 160 forms the color light 1615 after passing through the phosphor wheel 130, and the color light 1615 forms the color light 1625 after passing through the color wheel 140'. As illustrated in the color light 1615, the laser light 160 forms the yellow light 161Y after completely passing through the phosphor powder portion of the phosphor wheel 130. As illustrated in the color light 1625, a portion of the yellow light 161Y forms the red light 162R after passing through the red filter 140R', and another portion of the yellow light 161Y is filtered by the blue filter 140B'. As illustrated in FIG. 4D, red light intensity I1625 is the integration of the light intensity of the red light 162R measured by the light sensor 150 with time.

According to the red light intensity I1624 in FIG. 4B and the red light intensity I1625 FIG. 4D, the phase offset of the color wheel 140' reduces the total quantity of the red light 162R in the color light 1625, therefore the red light intensity I1625 is smaller than the red light intensity I1624.

As shown by the aforesaid embodiments that measure blue light (FIG. 3A to FIG. 3F) and red light (FIG. 4A to FIG. 4D), since the laser light 160 can be produced based on the time series of the synchronization signal 122 which is synchronized with the time series of the color wheel 140, and the light sensor 150 can measure different color lights, the optimized phase of the color wheel 140 can be determined by finding out the relative maximum of the integration of the different color light intensities with time. In other words, users can choose arbitrary colors of the color wheel 140 to perform the phase calibration of the color wheel 140.

Furthermore, since the phase calibration method is performed by comparing the relative quantities of the integrations of the light intensity, even if the phase offset of the phosphor wheel 130 or the color wheel 140 causes other color lights to be formed during the time series corresponding to the measured color light, the light intensity contributed from the overlapped light spectrum (for example, a part of the spectrum of green light overlaps with the spectrum of the red light) would not affect the relative value between the integration of the light intensities. Therefore, it would not affect the optimized phase of the phosphor wheel 130 and the optimized phase of the color wheel 140 determined by the phase calibration method of the present disclosure.

Also, a projector that uses laser light source requires use of a light sensor to provide feedback information for controlling the output power of the laser light source. The phase calibration method of the present disclosure is a further utilization of the light sensor. Accordingly, there is no need for an extra light sensor to be implemented outside the projector, and there is no need to determine whether the phosphor wheel phase and the color wheel phase are optimized by manually observing the waveform from the oscilloscope. Therefore, the phase calibration method of the present disclose can reduce the cost of labor, time, and production.

Referring to FIG. 1 and FIG. 2 together. In step (d) of the phase calibration method, when calibrating the phase of the phosphor wheel 130, the processor 120 of the laser projector 100 controls a phosphor wheel motor driver 132 to increase or decrease the phase of the phosphor wheel 130, and the processor 120 controls a color wheel motor driver 142 to maintain the same phase of the color wheel 140. When the phase of the color wheel 140 is going to be calibrated, the processor 120 of the laser projector 100 controls the color wheel motor driver 142 to increase or decrease the phase of the color wheel 140, and the processor 120 controls the phosphor wheel motor driver 132 to maintain the same phase of the phosphor wheel 130. The aforementioned actions are described as "changing the phases" in the following paragraphs.

In step (e), the light sensor 150 measures the second light intensity I2 of the laser light 160 having sequentially passed through the phosphor wheel 130 and the color wheel 140. The light sensor transmits information of the second light intensity I2 to the laser driver 112, and the processor 120 reads the information of the second light intensity I2 from the laser driver 112.

In step (f), the processor 120 of the laser projector 100 determines the way of changing the phases based on the relative quantity of the first light intensity I1 and the second light intensity I2.

Specifically, when calibrating the phase of the phosphor wheel 130, if the first light intensity I1 is greater than the second light intensity I2 and the phase of the phosphor wheel 130 is increased in step (d), then maintain the same phase of the color wheel 140 and decrease the phase of the phosphor wheel 130 in step (f). If the first light intensity I1 is greater than the second light intensity I2 and the phase of the phosphor wheel 130 is decreased in step (d), then maintain the same phase of the color wheel 140 and increase the phase of the phosphor wheel 130 in step (f). If the first light intensity I1 is smaller than the second light intensity I2 and the phase of the phosphor wheel 130 is increased in step (d), then maintain the same phase of the color wheel 140 and increase the phase of the phosphor wheel 130 in step (f). If the first light intensity I1 is smaller than the second light intensity I2 and the phase of the phosphor wheel 130 is decreased in step (d), then maintain the same phase of the color wheel 140 and decrease the phase of the phosphor wheel 130 in step (f).

Similarly, when calibrating the phase of the color wheel 140, if the first light intensity I1 is greater than the second light intensity I2 and the phase of the color wheel 140 is increased in step (d), then maintain the same phase of the phosphor wheel 130 and decrease the phase of the color wheel 140 in step (f). If the first light intensity I1 is greater than the second light intensity I2 and the phase of the color wheel 140 is decreased in step (d), then maintain the same phase of the phosphor wheel 130 and increase the phase of the color wheel 140 in step (f). If the first light intensity I1 is smaller than the second light intensity I2 and the phase of the color wheel 140 is increased in step (d), then maintain the same phase of the phosphor wheel 130 and increase the phase of the color wheel 140 in step (f). If the first light intensity I1 is smaller than the second light intensity I2 and the phase of the color wheel 140 is decreased in step (d), then maintain the same phase of the phosphor wheel 130 and decrease the phase of the color wheel 140 in step (f).

In other words, if the first light intensity I1 is greater than the second light intensity I2, it means that the direction of the phase changing in step (d) enhanced the phase offset. Therefore, the direction of the phase changing in step (f) is reversed.

In step (g), the light sensor 150 measures the third light intensity I3 of the laser light 160 having sequentially passed through the phosphor wheel 130 and the color wheel 140. The light sensor transmits information of the third light intensity I3 to the laser driver 112, and the processor 120 reads the information of the third light intensity I3 from the laser driver 112.

In step (h1), when the second light intensity I2 is greater than the first light intensity I1, and the third light intensity I3 is greater than the second light intensity I2, repeat step (f) and step (g); or when the second light intensity I2 is smaller than the first light intensity I1, and the third light intensity I3 is greater than the first light intensity I1, repeat step (f) and step (g). In other words, when the third light intensity I3 is greater than the first light intensity I1 and the second light intensity I2, it means that the direction of the phase changing in step (f) reduced the phase offset. Therefore, continue the direction of the phase changing in step (f) until the phase offset starts to increase again, then the optimized phases of the phosphor wheel 130 and the color wheel 140 can be determined.

In step (h2), when the second light intensity I2 is greater than the first light intensity I1, and the third light intensity I3 is smaller than the second light intensity I2, it means that the second light intensity I2 is the light intensity integration measured by the light sensor 150 that corresponds to the optimized phases of the phosphor wheel 130 or the color wheel 140. The processor 120 changes the phases of the phosphor wheel 130 or the color wheel 140 to the phases correspond to the second light intensity I2. Furthermore, when the second light intensity I2 is smaller than the first light intensity I1, and the third light intensity I3 is smaller than the first light intensity I1, it means that the first light intensity I1 is the light intensity integration measured by the light sensor 150 that corresponds to the optimized phases of the phosphor wheel 130 or the color wheel 140. The processor 120 changes the phases of the phosphor wheel 130 or the color wheel 140 to the phases correspond to the first light intensity I1.

According to the above steps, the optimized phases of the phosphor wheel 130 and the color wheel 140 that correspond to the maximum light intensity integration can be determined by measuring light intensity integration of different color lights by the light sensor 150, comparing the relative quantities of the light intensity integrations by the processor 120 to determine the direction of the phase changing that can reduce the phase offset, repeating steps of changing the phases and measuring the light intensity.

Figure 5:
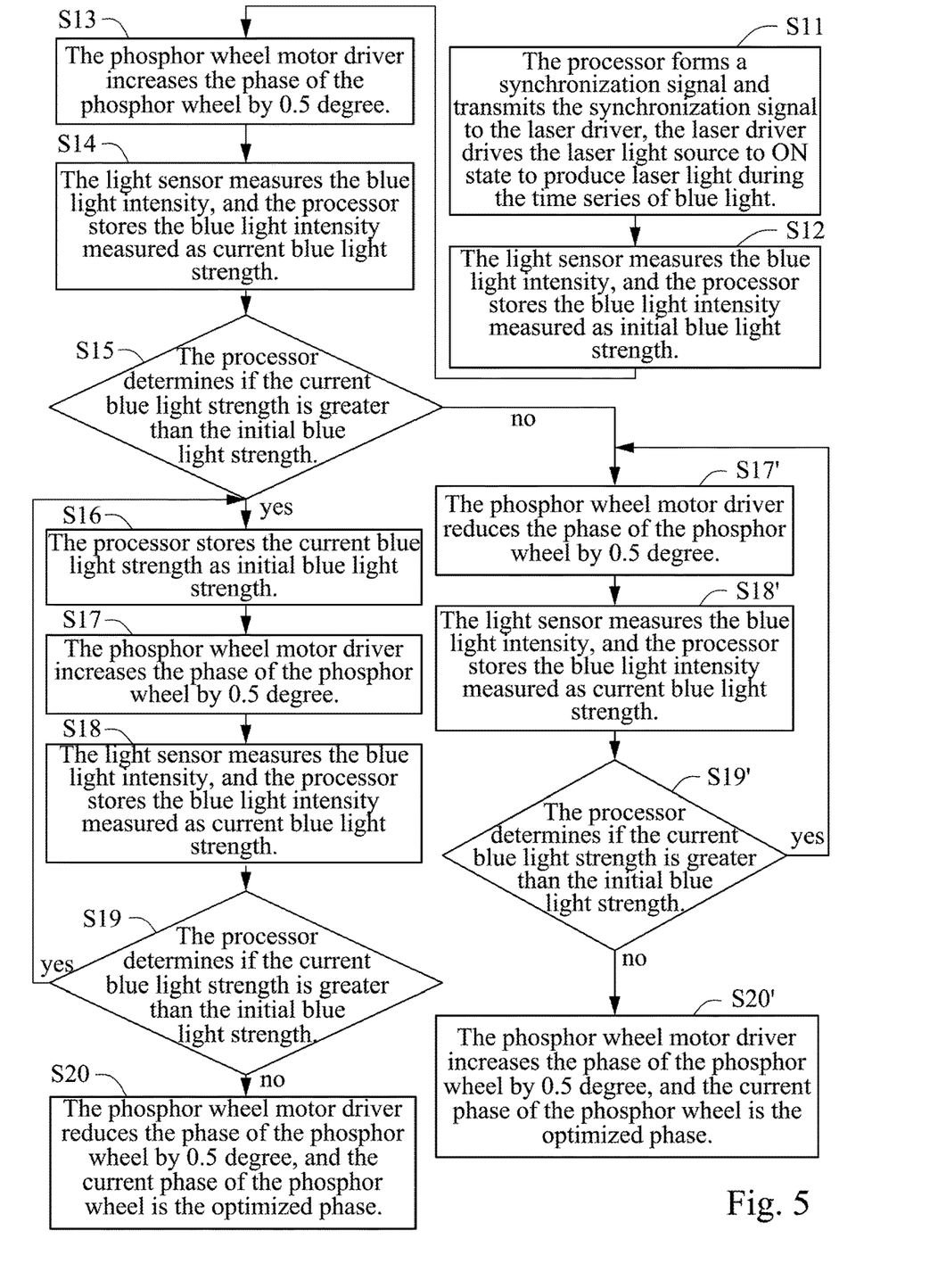
FIG. 5 is a schematic diagram of a phase calibration method of a phosphor wheel according to one embodiment of the present disclosure.

Referring to FIG. 1 and FIG. 5 together, in the present embodiment, the light sensor 150 measures the blue light 162B to calibrate the phase of the phosphor wheel 130.

In step S11, the processor 120 forms a synchronization signal 122 and transmits the synchronization signal 122 to the laser driver 112. The laser driver 112 drives the laser light source 114 to ON state to produce laser light 160 during the time series of blue light, and drives the laser light source 114 to OFF state during the time series of red light and green light. In step S12, the light sensor 150 measures the blue light intensity B1, and the processor 120 stores the blue light intensity B1 measured as initial blue light strength IB. In step S13, the phosphor wheel motor driver 132 increases the phase of the phosphor wheel 130 by 0.5 degree. In other embodiments, the phosphor wheel motor driver 132 may increase the phase of the phosphor wheel 130 by different degrees. In step S14, the light sensor 150 measures the blue light intensity B2, and the processor 120 stores the blue light intensity B2 measured as current blue light strength CB. In step S15, the processor 120 determines if the current blue light strength CB is greater than the initial blue light strength IB. If the current blue light strength CB is greater than the initial blue light strength IB, it means that the current direction of the phase changing can reduce the phase offset of the phosphor wheel 130, then step S16 is performed. If the current blue light strength CB is not greater than the initial blue light strength IB, then performs step S17'.

In step S16, the processor 120 stores the current blue light strength CB as initial blue light strength IB. In step S17, the phosphor wheel motor driver 132 increases the phase of the phosphor wheel 130 by 0.5 degree again. In step S18, the light sensor 150 measures the blue light intensity B3, and the processor 120 stores the blue light intensity B3 measured as current blue light strength CB. In step S19, the processor 120 determines if the current blue light strength CB is greater than the initial blue light strength IB. If the current blue light strength CB is greater than the initial blue light strength IB, it means that the phase offset of the phosphor wheel 130 has been reduced, then goes back to step S16 to iteratively perform the steps again. If the current blue light strength CB is not greater than the initial blue light strength IB, it means the phase offset of the phosphor wheel 130 has become greater than the phase offset of the phosphor wheel 130 at step S13 (when steps S16-S18 had not been repeated) or the phase offset when step S17 was performed the previous, therefore, step 20 is performed. In step S20, the phosphor wheel motor driver 132 reduces the phase of the phosphor wheel 130 by 0.5 degree, and the current phase of the phosphor wheel 130 is the optimized phase.

When step S17' is performed at the first time, the phosphor wheel motor driver 132 reduces the phase of the phosphor wheel by 1 degree so as to not arrive back at the same phase as in step S12, and the phosphor wheel motor driver 132 reduces the phase of the phosphor wheel by 0.5 degree when step S17' is repeated in the subsequent steps. In step S18', the light sensor 150 measures the blue light intensity B3', and the processor 120 stores the blue light intensity B3' measured as current blue light strength CB. In step S19', the processor 120 determines if the current blue light strength CB is greater than the initial blue light strength IB. If the current blue light strength CB is greater than the initial blue light strength IB, it means that the phase offset has been reduced, then goes back to step S17' to iteratively perform the steps again. If the current blue light strength CB is not greater than the initial blue light strength IB, it means the phase offset of the phosphor wheel 130 has become greater than the phase offset of the phosphor wheel 130 during step S12 (when steps S17'-S18' had not been repeated) or the phase offset when step S17' was performed the previous time, therefore, step 20' is performed. In step S20', the phosphor wheel motor driver 132 increases the phase of the phosphor wheel 130 by 0.5 degree, and the current phase of the phosphor wheel 130 is the optimized phase.

Figure 6:
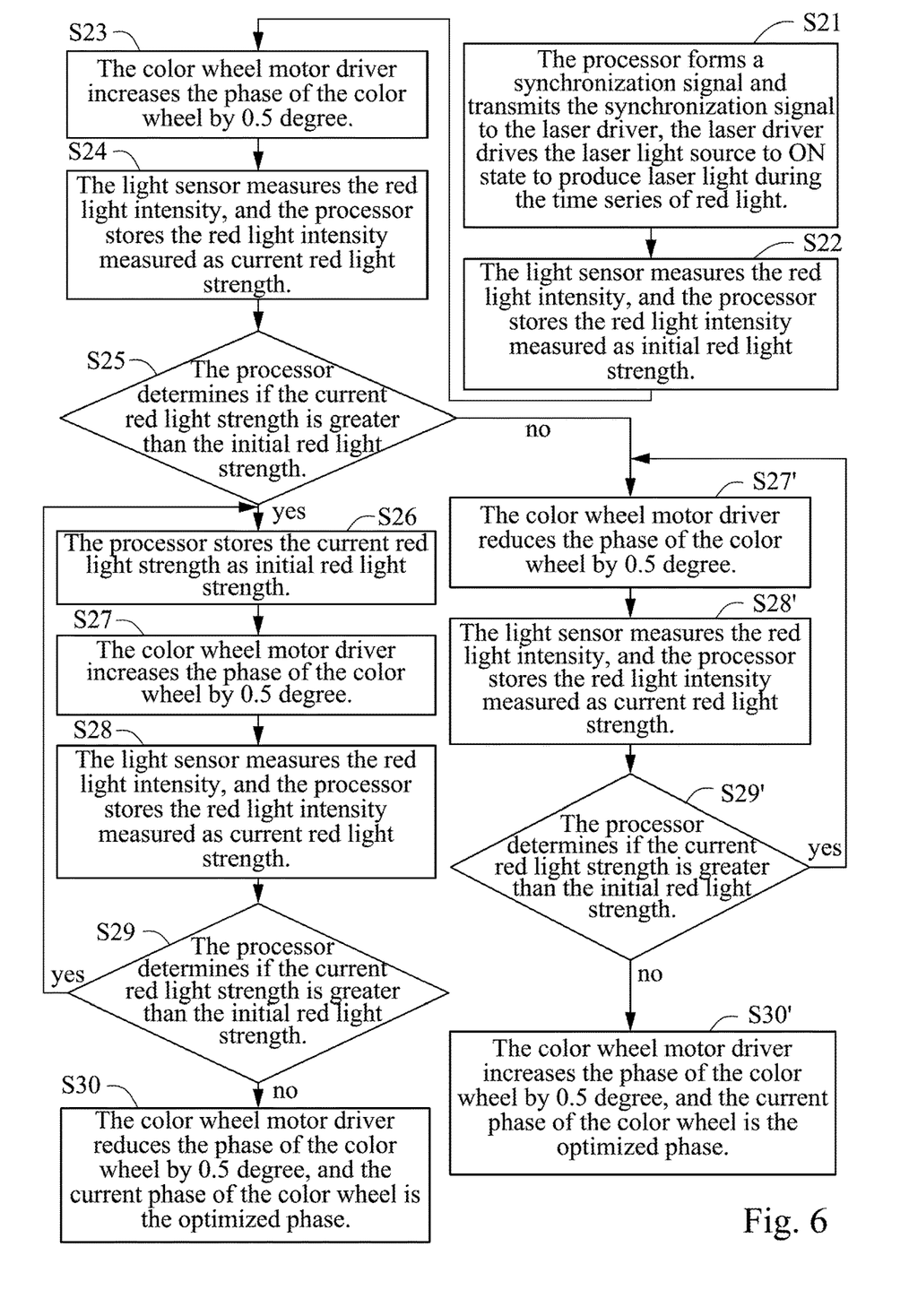
FIG. 6 is a schematic diagram of a phase calibration method of a color wheel according to one embodiment of the present disclosure.

Referring to FIG. 1 and FIG. 6 together. In the present embodiment, the light sensor 150 measures the red light 162R to calibrate the phase of the color wheel 140. In other embodiments, the light sensor 150 can measures other color lights of the color wheel 140 to calibrate the phase.

In step S21, the processor 120 forms a synchronization signal 122 and transmits the synchronization signal 122 to the laser driver 112. The laser driver 112 drives the laser light source 114 to ON state to produce laser light 160 during the time series of red light, and drives the laser light source 114 to the OFF state during the time series of blue light and green light. In step S22, the light sensor 150 measures the red light intensity R1, and the processor 120 stores the red light intensity R1 measured as initial red light strength IR. In step S23, the color wheel motor driver 142 increases the phase of the color wheel 140 by 0.5 degree. In other embodiments, the color wheel motor driver 142 may increase the phase of the color wheel 140 by different degrees. In step S24, the light sensor measures the red light intensity R2, and the processor 120 stores the red light intensity R2 measured as current red light strength CR. In step S25, the processor 120 determines if the current red light strength CR is greater than the initial red light strength IR. If the current red light strength CR is greater than the initial red light strength IR, it means that the current direction of the phase changing can reduce the phase offset of the color wheel 140, then step S26 is performed. If the current red light strength CR is not greater than the initial red light strength IR, then performs step S27'.

In step S26, the processor 120 stores the current red light strength CR as initial red light strength IR. In step S27, the color wheel motor driver 142 increases the phase of the color wheel 140 by 0.5 degree again. In step S28, the light sensor 150 measures the red light intensity R3, and the processor 120 stores the red light intensity R3 measured as current red light strength CR. In step S29, the processor 120 determines if the current red light strength CR is greater than the initial red light strength IR. If the current red light strength CR is greater than the initial red light strength IR, it means that the phase offset of the color wheel 140 has been reduced, then goes back to step S26 to iteratively perform the steps again. If the current red light strength CR is not greater than the initial red light strength IR, it means the phase offset of the color wheel 140 has become greater than the phase offset of the color wheel 140 at step S23 (when steps S26-S28 had not been repeated) or the phase offset when step S27 was performed the previous time, therefore, step 30 is performed. In step S30, the color wheel motor driver 142 reduces the phase of the color wheel 140 by 0.5 degree, and the current phase of the color wheel 140 is the optimized phase.

When step S27' is performed at the first time, the color wheel motor driver 142 reduces the phase of the color wheel by 1 degree so as to not arrive back at the same phase as in step S22, and the color wheel motor driver 142 reduces the phase of the color wheel by 0.5 degree when step S27' is repeated in the subsequent steps. In step S28', the light sensor 150 measures the red light intensity R3', and the processor 120 stores the red light intensity R3' measured as current red light strength CR. In step S29', the processor 120 determines if the current red light strength CR is greater than the initial red light strength IR. If the current red light strength CR is greater than the initial red light strength IR, it means that the phase offset has been reduced, then goes back to step S27' to iteratively perform the steps again. If the current red light strength CR is not greater than the initial red light strength IR, it means the phase offset of the color wheel 140 has become greater than the phase offset of the color wheel 140 during step S22 (when steps S27'-S28' had not been repeated) or the phase offset when step S27' was performed the previous time, therefore, step 30' is performed. In step S30', the color wheel motor driver 142 increases the phase of the color wheel 140 by 0.5 degree, and the current phase of the color wheel 140 is the optimized phase.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein.

What is claimed is:

1. A phase calibration method applied for a laser projector, the phase calibration method comprising steps of:
    (a) transmitting, by a processor, a synchronization signal to a laser driver;
    (b) controlling, by the laser driver, switches of a laser light source based on a time series of the synchronization signal;
    (c) measuring, by a light sensor, a first light intensity of a laser light of the laser light source having sequentially passed through a phosphor wheel and a color wheel;
    (d) changing a phase of the phosphor wheel or a phase of the color wheel;
    (e) measuring, by the light sensor, a second light intensity of the laser light of the laser light source having sequentially passed through the phosphor wheel and the color wheel;
    (f) further changing the phase of the phosphor wheel or the phase of the color wheel by:
        (f1) decreasing the phase of the phosphor wheel or the phase of the color wheel, if the first light intensity is greater than the second light intensity, and the phase of the phosphor wheel or the phase of the color wheel is increased in step (d); or
        (f2) decreasing the phase of the phosphor wheel or the phase of the color wheel, if the first light intensity is smaller than the second light intensity, and the phase of the phosphor wheel or the phase of the color wheel is decreased in step (d); or
        (f3) increasing the phase of the phosphor wheel or the phase of the color wheel, if the first light intensity is greater than the second light intensity, and the phase of the phosphor wheel or the phase of the color wheel is decreased in step (d); or
        (f4) increasing the phase of the phosphor wheel or the phase of the color wheel, if the first light intensity is smaller than the second light intensity, and the phase of the phosphor wheel or the phase of the color wheel is increased in step (d);
    (g) measuring a third light intensity of the laser light of the laser light source having sequentially passed through the phosphor wheel and the color wheel by the light sensor; and
    (h) repeating step (f) and step (g) if
    the second light intensity is greater than the first light intensity, and the third light intensity is greater than the second light intensity; or
    the second light intensity is smaller than the first light intensity, and the third light intensity is greater than the first light intensity.

2. The phase calibration method of claim 1, wherein step (a) further comprises:
    synchronizing the time series of the synchronization signal and a time series of the color wheel.

3. The phase calibration method of claim 1, wherein the first light intensity, the second light intensity and the third light intensity are an integration of light values sensed by the light sensor over time.

4. The phase calibration method of claim 1, further comprising:
after each of step (c), step (e), and step (g), transmitting, by the light sensor, information of the first light intensity, the second light intensity, and the third light intensity, respectively, to the laser driver.

5. The phase calibration method of claim 4, further comprising:
after each of step (c), step (e), and step (g), reading information of the first light intensity, the second light intensity, and the third light intensity, respectively, from the laser driver by the processor.

6. The phase calibration method of claim 1, wherein changing the phase of the color wheel in step (d) comprises controlling, by the processor, a color wheel motor driver to change the phase of the color wheel, and wherein changing the phase of the color wheel in step (f) comprises controlling, by the processor and based on information of the first light intensity and the second light intensity, the color wheel motor driver to change the phase of the color wheel.

7. The phase calibration method of claim 1, wherein changing the phase of the phosphor wheel in step (d) comprises controlling, by the processor, a phosphor wheel motor driver to change the phase of the phosphor wheel, and wherein changing the phase of the phosphor wheel in step (f) comprises controlling, by the processor and based on information of the first light intensity and the second light intensity, the phosphor wheel motor driver to change the phase of the phosphor wheel.

8. The phase calibration method of claim 1, wherein step (d) comprises increasing or decreasing the phase of the color wheel or the phase of the phosphor wheel, and step (f) comprises increasing or decreasing the phase of the color wheel or the phase of the phosphor wheel.

9. The phase calibration method of claim 1, wherein step (d) comprises maintaining the same phase of the color wheel and increasing or decreasing the phase of the phosphor wheel, and step (f) comprises maintaining the same phase of the color wheel and increasing or decreasing the phase of the phosphor wheel.

10. The phase calibration method of claim 1, wherein in step (d), changes of the phase of the phosphor wheel do not repeat, and in step (f), changes of the phase of the phosphor wheel do not repeat.

11. The phase calibration method of claim 1, wherein step (d) comprises maintaining the same phase of the phosphor wheel and increasing or decreasing the phase of the color wheel, and step (f) comprises maintaining the same phase of the phosphor wheel and increasing or decreasing the phase of the color wheel.

12. The phase calibration method of claim 1, wherein in step (d), changes of the phase of the color wheel do not repeat, and in step (f), changes of the phase of the color wheel do not repeat.

13. The phase calibration method of claim 1, wherein step (h) further comprises:
if the second light intensity is greater than the first light intensity and the third light intensity is smaller than the second light intensity: changing the phase of the phosphor wheel to the phase of the phosphor wheel that corresponds to the second light intensity; or changing the phase of the color wheel to the phase of the color wheel that corresponds to the second light intensity.

14. The phase calibration method of claim 1, wherein step (h) further comprises:
if the second light intensity is smaller than the first light intensity and the third light intensity is smaller than the first light intensity: changing the phase of the phosphor wheel to the phase of the phosphor wheel that corresponds to the first light intensity; or changing the phase of the color wheel to the phase of the color wheel that corresponds to the first light intensity.

15. A laser projector, comprising:
a laser light source module including a laser driver, wherein the laser light source module is configured to produce a laser light;
a processor electrically connected to the laser driver and configured to transmit a synchronization signal to the laser driver;
a phosphor wheel electrically connected to the processor;
a color wheel electrically connected to the processor; and
a light sensor electrically connected to the laser driver,
wherein the phosphor wheel is located between the laser light source module and the color wheel, wherein the color wheel is located between the phosphor wheel and the light sensor, and wherein the light sensor is configured to sense an intensity of the laser light produced by the laser light source module and having sequentially passed through the phosphor wheel and the color wheel.

16. The laser projector of claim 15, further comprising:
a reflection mirror located between the color wheel and the light sensor, wherein the light sensor is located at a side of the reflection mirror distal to the color wheel.

17. The laser projector of claim 15, further comprising a housing, wherein the light sensor is located in the housing.

18. The laser projector of claim 15, further comprising:
a phosphor wheel motor driver, wherein the phosphor wheel is electrically connected to the processor through the phosphor wheel motor driver, and the processor is configured to control the phosphor wheel motor driver to change a phase of the phosphor wheel; and
a color wheel motor driver, wherein the color wheel is electrically connected to the processor through the color wheel motor driver, and the processor is configured to control the color wheel motor driver to change a phase of the color wheel.

* * * * *